United States Patent
Braun

(10) Patent No.: US 12,467,491 B2
(45) Date of Patent: Nov. 11, 2025

(54) ACTUATION UNIT, LOCKING UNIT AND CLAMPING UNIT FOR A POWER HAND TOOL

(71) Applicant: Robert Bosch GmbH, Stuttgart (DE)

(72) Inventor: Willy Braun, Neustetten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 994 days.

(21) Appl. No.: 17/282,895

(22) PCT Filed: Oct. 14, 2019

(86) PCT No.: PCT/EP2019/077778
§ 371 (c)(1),
(2) Date: Apr. 5, 2021

(87) PCT Pub. No.: WO2020/099047
PCT Pub. Date: May 22, 2020

(65) Prior Publication Data
US 2021/0347031 A1    Nov. 11, 2021

(30) Foreign Application Priority Data
Nov. 14, 2018  (DE) .......................... 102018219390.8

(51) Int. Cl.
*F16B 2/16* (2006.01)
*B25F 5/02* (2006.01)
(Continued)

(52) U.S. Cl.
CPC . *F16B 2/16* (2013.01); *B25F 5/02* (2013.01)

(58) Field of Classification Search
CPC ........ Y10S 403/04; F16B 2/16; F16B 5/0084; F16B 5/0088; Y10T 403/591;
(Continued)

(56) References Cited

U.S. PATENT DOCUMENTS 2,284,180 A * 5/1942 Metcalf ................. E05B 83/367
403/DIG. 4
5,933,966 A * 8/1999 Yates ..................... A01D 34/90
403/325

(Continued)

FOREIGN PATENT DOCUMENTS

| CN | 1745981 A | 3/2006 |
| CN | 101997100 A | 3/2011 |

(Continued)

OTHER PUBLICATIONS

Search Report issued by CIPO on Mar. 4, 2024 in corresponding application No. 2019800752362.

(Continued)

*Primary Examiner* — Amber R Anderson
*Assistant Examiner* — Zachary A Hall
(74) *Attorney, Agent, or Firm* — NORTON ROSE FULBRIGHT US LLP

(57) ABSTRACT

An actuating unit for releasing a battery device for a hand-held power tool having a locking element for locking the actuating unit and having an actuating element that is provided to move the locking element from a retaining state into a release state of the actuating unit. It is provided that in the release state, the locking element is held with a positive fit and/or with a frictional fit.

15 Claims, 12 Drawing Sheets

(51) Int. Cl.
*H01M 50/244* (2021.01)
*H01M 50/247* (2021.01)
*H01M 50/262* (2021.01)

(58) Field of Classification Search
CPC ............ Y10T 403/592; Y10T 403/599; Y10T 403/60; Y10T 403/602; Y10T 403/604; Y10T 403/61; Y10T 403/7076; Y10T 403/7092; H01M 50/244; H01M 50/247; H01M 50/262
See application file for complete search history.

(56) References Cited

U.S. PATENT DOCUMENTS

| | | | | |
|---|---|---|---|---|
| 6,851,341 | B2 * | 2/2005 | Iwinski | B25B 23/0021 81/177.85 |
| 7,330,006 | B2 * | 2/2008 | Iwata | B25F 5/008 318/400.41 |
| 8,024,997 | B2 * | 9/2011 | Davidson | B25B 23/0035 81/177.85 |
| 8,616,647 | B2 * | 12/2013 | Chen | B62B 9/104 280/47.38 |
| 9,969,013 | B2 * | 5/2018 | Mehta | B23Q 11/0089 |
| 2005/0218867 | A1 | 10/2005 | Phillips et al. | |
| 2006/0055370 | A1 | 3/2006 | Duesselberg | |
| 2007/0277987 | A1 | 12/2007 | Meyer et al. | |
| 2012/0251229 | A1 * | 10/2012 | Liang | H01M 50/213 403/321 |
| 2023/0371771 | A1 * | 11/2023 | Wang | A47L 9/22 |
| 2025/0030195 | A1 * | 1/2025 | Hartmann | H01R 13/6315 |

FOREIGN PATENT DOCUMENTS

| | | |
|---|---|---|
| CN | 102877722 A | 1/2013 |
| CN | 207719300 U | 8/2018 |
| DE | 102004049085 A1 | 4/2006 |
| DE | 102006050816 B4 | 10/2015 |
| DE | 102015226423 A1 | 6/2017 |
| EP | 2323197 A2 | 5/2011 |
| EP | 3025825 A1 | 6/2016 |
| EP | 3321040 A1 | 5/2018 |
| JP | H08162082 A | 6/1996 |
| KR | 100704551 B1 | 4/2007 |
| KR | 20180065740 A | 6/2018 |
| TW | M567164 U | 9/2018 |

OTHER PUBLICATIONS

International Search Report for PCT/EP2019/077778, Issued Jan. 28, 2020.

* cited by examiner

ACTUATION UNIT, LOCKING UNIT AND CLAMPING UNIT FOR A POWER HAND TOOL

FIELD

The present invention relates to an actuating unit, a locking unit, and a clamping unit.

BACKGROUND INFORMATION

German Patent Application No. DE 10 2015 226 423 A1 describes a hand-held power tool, in particular a hammer drill and/or hammer chisel, having at least one accumulator and having at least one battery interface to a mechanical receptacle of the accumulator. The hand-held power tool has at least one active clamping unit that is provided to clamp the accumulator in or on the battery interface in an operating position.

SUMMARY

An object of the present invention is to use simple constructive measures to improve a hand-held power tool, in particular an actuating unit, a locking unit, and/or a clamping unit.

The object may achieved by an actuating unit in accordance with an example embodiment of the present invention. In accordance with an example embodiment of the present invention, an actuator is provided for releasing a battery device for a hand-held power tool having a locking element for locking the actuating unit and having an actuating element that is provided to move the locking element from a retaining state into a release state of the actuating unit.

According to an example embodiment of the present invention, in the release state the locking element is held with a positive fit and/or with a frictional fit.

In this way, for example a battery device can be detached or released from the hand-held power tool in a particularly advantageous manner, by actuating the actuating unit using the actuating element on the hand-held power tool. For example in the case of particularly heavy or bulky battery devices, it can be useful to release the battery device before removal. Here, the battery device can be prepared for removal from the hand-held power tool by for example putting the actuating unit into a release state in which the battery device is not locked or clamped relative to the hand-held power tool. In this way, an operator of the hand-held power tool can thus concentrate exclusively on the removal of the battery device, without having to carry out possible further actuations.

In order to enable power to be supplied to high-performance power tools, battery devices are becoming increasingly larger and heavier. Due to a constantly increasing energy requirement in battery applications, the battery devices must frequently be charged and exchanged. For example, there may be battery applications that require changing the battery devices at intervals of 5 minutes. Using the present invention, in particular heavy, bulky, and/or unwieldy battery devices can be exchanged particularly easily, increasing usefulness for the operator. For example, an ergonomic and comfortable change of the battery device is possible if an operator of the handheld power tool can detach the battery device from the hand-held power tool independently of an actuation of the actuating unit, preferably using one-hand operation. This is enabled in that the actuating unit, in a release state, can be provided to hold a clamping or a locking of the battery device in an unclamped or unlocked state.

In this way, using the present invention, an actuation of the actuating unit, in particular of a locking unit and/or of a clamping unit, can be held in a release state. The actuating unit, in particular the locking unit and/or the clamping unit, can go, in particular automatically, from the release state into the retaining state as a function of an acceptance process and/or a relative movement of the battery device, in particular in order to clamp and/or to lock the battery device to the hand-held power tool.

In particular, the release state of the actuating unit can form a bistable state in which the actuating unit remains, for at least a limited time, in the release state when there is an actuation of the actuating unit.

Preferably, the actuating unit can be designed such that the actuating unit can be displaced from the retaining state into the release state via an actuation by, for example, an operator. Most preferably, the actuating unit can be designed such that the actuating unit can be displaced by the battery device from the release state to the retaining state via an actuation, in particular when there is an acceptance process of the battery device with the hand-held power tool.

As hand-held power tools, in particular hammer drills, screwdrivers, circular saws, or any other tools considered appropriate by the person skilled in the art may be used.

Other applications that appear appropriate to the person skilled in the art for such an actuating unit may also be useful, such as its use in an e-bike, or in a vacuum device for a hand-held power tool.

An "actuating element" is to be understood in particular as an element that is provided to, during an actuating process, accept an input variable from an operator and in particular to be immediately contacted by an operator, a contacting of the actuating element being sensed and/or an actuating force applied to the actuating element being sensed and/or mechanically forwarded in order to actuate a unit.

A retaining state is to be understood as a state that obtains in particular in a rest state, or in a non-tensioned or partially tensioned state, of the actuating unit, in particular of the locking element. The retaining state can form a bottom dead center point of a movement of the actuating unit, in particular of the actuating element.

A release state is to be understood as a state in which the actuating unit, in particular the locking element, is in a state in which it is moved from a rest position of the actuating unit, and in particular is in a tensioned, or at least partly tensioned, state. The release state can be provided in order to release the battery device relative to the hand-held power tool, in that an operator of the hand-held power tool locks a movement of the locking element.

The retaining state and/or the release state are in particular actuation states of the actuating element.

The locking element can be fashioned as a locking bolt. The locking element can be fashioned as a locking pin. The locking element can be provided to limit a relative movement of the actuating unit, in particular of the actuating element, at least in a release state, in particular to limit or to lock it in a positively locking manner. The locking element can be mounted so as to be movable relative to the actuating element. The locking element can be mounted so as to be pre-tensioned or spring-loaded in or on the actuating element. The locking element can be mounted so as to be movable along a first direction of movement. The actuating element can be mounted so as to be movable along a second direction of movement. The first direction of movement can be oriented transverse, in particular perpendicular, to the second direction of movement.

Further useful developments of the actuating unit according to the present invention are disclosed herein.

Actuating Unit

In accordance with an example embodiment of the present invention, it can be useful for the actuating element to be pre-tensioned in at least the release state, in particular by a first spring element, in particular in order to exert a force on the actuating element and/or the locking element, and to displace the actuating element from the release state into the retaining state. The first spring element can be tensioned in the release state. The first spring element can be partially tensioned, or not tensioned, in the retaining state. In this way, it can be ensured that the actuating unit can be reset in a particularly simple and reliable manner.

In addition, in accordance with an example embodiment of the present invention, it can be useful for the locking element to be pre-tensioned in at least the release state, in particular by a second spring element, in particular in order to exert a force on the locking element and to hold the locking element in the release state, in particular with a frictional and/or positive fit. In particular, the actuating unit is capable of being held in the release state by a force of the first spring element and a force of the second spring element. The first spring element and the second spring element can be fashioned as a tension spring or pressure spring, or as any other spring element considered useful by a person skilled in the art. In this way, the locking element can be held in the release state particularly reliably.

A "spring element" is to be understood in particular as a macroscopic element that has at least an extension that, in a normal operating state, can be elastically modified by at least 10%, in particular by at least 1%, preferably by at least 30%, and particularly advantageously by at least 50%, and that produces a counter-force that is in particular a function of a modification of the extension and is preferably proportional to the modification, acting counter to the modification. An "extension" of an element is to be understood in particular as a maximum distance between two points of a perpendicular projection of the element onto a plane, in particular of at least 1 mm, in particular at least 5 mm, and preferably at least 10 mm.

In addition, in accordance with an example embodiment of the present invention, it can be useful for the actuating unit to have a control unit that is provided to hold the locking element in a release state or a retaining state via the first and/or the second spring element. In addition, it can be useful for the control element to have a stop surface that is provided to hold the locking element in the release state with a positive fit and/or with a frictional fit. The control element can form a control contour. The control element can be fashioned as a control groove or as a control raised part. The control element can be fashioned as a guide groove that is provided in particular to guide the locking element. The control element can be provided in particular to limit a relative movement of the locking element, in particular with a positive fit, preferably via the stop surface. The control element can be situated in a housing, in particular of the hand-held power tool or of the battery device. The control element can have two guide surfaces. The guide surfaces can be configured parallel to one another. The guide surfaces can be configured at a distance from one another. The guide surfaces can be separated by the stop surface. The stop surface can be situated transverse, in particular perpendicular, to at least one of the guide surfaces. The guide surfaces can be positioned at different height levels. An overcoming of the height level from one guide surface to a second guide surface can take place in that the locking element is displaced for example by the battery device in order to overcome the height difference. In this way, the locking element can be held in the control element in a particularly compact and reliable manner.

In accordance with an example embodiment of the present invention, it is provided that the locking element be capable of being displaced from the release state into the retaining state as a function of a relative movement, in particular of an acceptance process, of the battery device. In particular, the battery device can be provided to actuate or to contact the locking element, indirectly or directly, in such a way that the locking element is displaced from the release state into the retaining state. In this way, when there is an acceptance process of the battery device the actuating unit can be displaced from the release state into the retaining state in a particularly reliable manner.

An acceptance process is to be understood as an accepting, in particular a connecting, preferably a plugging, of the battery device on or in the hand-held power tool. In particular, an acceptance process is to be understood as a process of plugging the battery device into the hand-held power tool.

In accordance with an example embodiment of the present invention, it is further provided that the actuating unit have a coupling element that is provided to contact the locking element in the release state. In at least one state, the coupling element can be situated in the control element. The coupling element can be mounted so as to be movable relative to the locking element and/or relative to the control element. The coupling element can be mounted so as to be movable relative to the actuating element. In the release state, the coupling element, in particular a relative movement of the coupling element, can be limited by the locking element and/or by the battery device. The coupling element can be provided to, in at least the release state, immediately contact the locking element and/or the battery device.

In particular, a first release state can be provided that holds the locking element in a release state. Preferably, a second release state can be provided that holds the locking element in a release state. In the first release state, the locking element can be held with a positive fit and/or with a frictional fit relative to the coupling element. In the first release state, the locking element can be held relative to a further stop surface that is formed on the coupling element. In the second release state, the locking element can be held with a positive fit and/or with a frictional fit relative to the control element, in particular a stop surface of the control element. In the first release state, the locking element can be more strongly pre-tensioned, in particular pre-tensioned by the first and/or the second spring element, than in the second release state.

In the first release state, the coupling element, in particular a relative movement of the coupling element, can be limited by the battery device. In the second release state, the coupling element, in particular a relative movement of the coupling element, can be limited by the locking element.

In accordance with an example embodiment of the present invention, it is further provided that the actuating unit have a/the coupling element, which is provided to displace the locking element from the release state into the retaining state. In particular, the coupling element can, in an accepting state, act counter to the second spring element, in particular to the spring action of the second spring element, in particular in order to displace the locking element from the release state into the retaining state. An accepting state is to be understood in particular as a state in which the battery device is accepted on the hand-held power tool. In this way, given an acceptance of the battery device with the hand-held power tool, the actuating unit can be automatically displaced into the retaining state.

In accordance with an example embodiment of the present invention, it can be useful for the battery device, in particular a triggering element of the battery device, to be provided in order to exert a triggering force indirectly or directly on the locking element in such a way that the locking element can be displaced from a release state into a retaining state. In particular, the locking element can be displaced from the release state into the retaining state by the triggering force acting on the actuating element.

In addition, in accordance with an example embodiment of the present invention, it can be useful for a/the coupling element to be provided in order to exert a triggering force on the locking element in such a way that the locking element can be displaced from a release state into a retaining state. The triggering force can in particular act counter to the second spring element in order to displace the locking element from the release state into the retaining state. In particular, the locking element can be displaced from the release state into the retaining state by the triggering force acting on the actuating element. In addition, it can be useful for the coupling element to be provided to move the coupling element via a battery device that is movable relative to the coupling element, in particular to move the coupling element in such a way that the coupling element exerts a triggering force on the locking element. In this way, in a simple and intuitive manner a release state of the actuating unit can be provided in order to release the battery device from the hand-held power tool or to connect it to the hand-held power tool.

In addition, in accordance with an example embodiment of the present invention, it can be useful for the coupling element to be situated on a side of the locking element facing away from the second spring element.

In addition, it can be useful for the coupling element to be made in the shape of a ball or in the shape of a cone, the coupling element being mounted so as to be movable at least relative to the locking element. The coupling element can have a T-shaped cross-section. The coupling element can be made at least substantially in the shape of a bolt.

In addition, in accordance with an example embodiment of the present invention, it can be useful for the coupling element to stand out at least in some segments relative to the hand-held power tool. The coupling element can limit the handheld power tool. In at least one state, the coupling element can stand out from a housing, in particular of the hand-held power tool or of the battery device. The coupling element can stand out relative to a housing, in particular of the hand-held power tool or of the battery device.

In addition, in accordance with an example embodiment of the present invention relates to a hand-held power tool having an actuating unit and having a locking unit for locking a battery device to a hand-held power tool.

In accordance with an example embodiment of the present invention, it can be useful for the locking unit to have a locking element that is provided to lock the battery device relative to the hand-held power tool, in particular with a positive fit. In particular, the locking element is provided in order to prevent a movement of the battery device in a retaining state of the actuating unit.

In addition, the present invention relates to a hand-held power tool having an actuating unit and having a clamping unit for clamping a battery device to a hand-held power tool.

It can be useful for the clamping unit to have a clamping element that is provided to clamp the battery device relative to the hand-held power tool, in particular with a frictional fit. In particular, the clamping element is provided in order to prevent a movement of the battery device in a retaining state of the actuating unit.

Locking Unit

In addition, an example embodiment of the present invention relates to a locking unit for locking a battery device to a hand-held power tool, having a locking element for the locking, in particular with a positive fit, of the battery device relative to the hand-held power tool, and having an actuating element that is mounted so as to be movable relative to the locking element, the actuating element being provided in order to move the locking element from a locked state to an unlocked state of the locking unit.

In accordance with an example embodiment of the present invention, it can be useful for the actuating element to have a first guide element, in particular a guide groove, that is provided in order to move the locking element from a locked state to an unlocked state.

In this way, the battery device can be held particularly usefully on the hand-held power tool, by locking the battery device using the locking element, in a retaining state of the actuating unit.

In this way, the locking element can be coupled to the actuating unit, in particular to the actuating element. The locking element can be mounted so as to be movable relative to the actuating element. The locking element can be coupled to the actuating element. The actuating unit, in particular the actuating element, can be provided to displace, in particular by an actuation of the actuating element, the locking element from an unlocked state into a locked state, or vice versa.

Preferably, the guide element is provided to couple the actuating unit, in particular the actuating element, to the locking element. In particular, the guide element is provided to exert a compulsive force on the locking element in order to displace the locking element from an unlocked state into a locked state. When there is an actuation of the actuating element, it is provided that the locking element to move via the guide element.

It can be useful for the locking element to be fashioned as a locking bolt. The locking bolt can have a circular or polygonal, in particular square or rectangular, cross-section. In this way, in a particularly simple manner a reliable locking can be enabled.

In addition, in accordance with an example embodiment of the present invention, it can be useful for the locking unit to have a locking opening provided in the battery device. The locking opening can be realized as a locking trough. The locking opening can be realized as a locking recess. The locking opening can be situated in a housing, in particular of the hand-held power tool or of the battery device. The housing can in particular be realized as an external housing. The locking opening can extend transversely, in particular perpendicular, relative to a direction of acceptance of the battery device. In this way, a reliable locking can be achieved.

In addition, in accordance with an example embodiment of the present invention, it can be useful for the locking element to be provided in order to be connected to the battery device with a positive fit, in particular to hold the battery device with a positive fit in or on the hand-held power tool, opposite a direction of acceptance of the battery device. In particular, the locking element is provided to prevent a movement of the battery device in a locked state of the locking unit. The actuating unit can be provided to lock the locking unit as a function of an acceptance path, in particular an insertion path, of the battery device into the hand-held power tool.

In addition, in accordance with an example embodiment of the present invention, it can be useful for the locking element to be mounted so as to be movable relative to the hand-held power tool, in particular relative to a tool housing of the hand-held power tool, and relative to the actuating element. In particular, the locking element can be mounted so as to be movable relative to the actuating element. The locking element can be mounted so as to be movable from an unlocked state into a locked state transverse, in particular perpendicular to, a plane of acceptance. The hand-held power tool can limit a first relative movement of the locking element. The actuating element can limit a second relative movement of the locking element. The first relative movement can be oriented transverse to the second relative movement. In this way, a particularly simple locking element can be realized.

In accordance with an example embodiment of the present invention, it is provided that the locking element, at least in the locked state, stand out relative to the hand-held power tool, in particular a tool housing of the hand-held power tool. In an alternative specific embodiment, the locking element, at least in the locked state, can stand out relative to the battery device, in particular a battery housing of the battery device. In this way, a particularly reliable locking can be ensured.

In addition, in accordance with an example embodiment of the present invention, it is provided that the locking unit have a second guide element, in particular a second guide groove. The second guide element, in particular the second guide groove, can be realized transverse, in particular perpendicular, to the first guide element, in particular the first guide groove. The second guide element, in particular the second guide groove, can be situated in the hand-held power tool, in particular in a tool housing of the hand-held power tool. In addition, it is proposed that the first guide element, in particular the first guide groove, and the second guide element, in particular the second guide groove, each be realized as oblong holes. The guide grooves run in a straight line. The second guide groove can run transverse, in particular perpendicular, to the plane of acceptance of the battery device. The first guide groove can extend essentially in the direction along the plane of acceptance. In this way, a reliable locking can be achieved.

The plane of acceptance should form a plane that extends at least substantially along a direction of acceptance of the battery device for connecting the battery device to the hand-held power tool. For this purpose, the hand-held power tool can have guides that are provided to form, with guides, in particular with guide rails, of the battery device, a movement of insertion of the battery device along the plane of acceptance.

In accordance with an example embodiment of the present invention, it can be useful for the locking element to be mounted on the first guide groove and on the second guide groove via a guide pin, realized as a transverse securing pin. The guide grooves can be provided in order to bring about a relative movement of the locking element relative to the hand-held power tool. The guide grooves can be provided in order to apply a compulsory movement to the guide pin. The guide pin can be mounted movably, in particular movable rotationally, relative to the guide element. In this way, the locking element can be controlled particularly advantageously.

In addition, in accordance with an example embodiment of the present invention, it can be useful for the locking element to be movably mounted transversely, in particular perpendicular, to a plane of acceptance of the battery device.

In addition, in accordance with an example embodiment of the present invention, it can be useful for the actuating element to be realized as an actuating button. The actuating element can be provided in order to displace the locking element in an actuating state, in particular in a release state of the actuating unit, into an unlocked state. The actuating element can be provided to displace the locking element in a retaining state, in particular in a retaining state of the actuating unit, into a locked state.

In an alternative specific embodiment of the present invention, the actuating unit and/or the locking unit can be provided in the battery device so that the locking unit can connect the battery device to the hand-held power tool, analogously to the features described above. In this way, the hand-held power tool could be realized particularly compactly.

In addition, the present invention relates to a hand-held power tool having a locking unit as disclosed herein and having an actuating unit for releasing a battery device for the hand-held power tool.

Clamping Unit

In addition, an example embodiment of the present invention relates to a clamping unit for clamping a battery device to a hand-held power tool, having a clamping element for clamping the battery device and having an actuating element mounted movably relative to the clamping element, which actuating element is provided in order to move the clamping element from an unclamped state into a clamped state of the clamping unit.

In accordance with an example embodiment of the present invention, it can be useful for the actuating element to be provided to displace the clamping element, via a relative movement, from the clamped state into the unclamped state.

A relative movement can form a translational and/or a rotational movement.

In this way, a battery device can be connected particularly advantageously to a hand-held power tool by clamping the battery device to the hand-held power tool using the actuating element. In particular, the battery device can be clamped to the hand-held power tool particularly reliably without play. Using such a clamping, it can be ensured that, even given the use of heavy battery devices, it is ensured that the battery device does not detach from the hand-held power tool, and is not subjected to a high degree of wear due to play or rattling movements. In particular, the clamping element is provided to be moved relative to the battery device in order to exert a clamping force on the battery device and to clamp the battery device in or on the clamping unit.

A hand-held power tool may be in particular a hammer drill. In particular, hammer drills are used to process stone and have a high degree of impact energy in order to partially detach and break up the processed stone. The high degree of impact energy causes a high degree of vibrational loading, in particular of parts of the hammer drill that are movably mounted, or subject to play, such as standard battery devices. Detached stone can, inter alia, be distributed as dust in the air, and can settle on the movably mounted parts, or parts subject to play, such as the battery device, and on the hand-held power tool, and can have, inter alia, an abrasive effect on both the mechanical and the electrical contacts.

In particular, the relative movement can form a rotational movement. The rotational movement can be for example an eccentric movement formed by a circular eccentric gear mechanism. The rotational movement can be produced for example by a knee lever gear mechanism. In this way, the gear mechanism can be used as a force booster in order to displace the clamping unit from an unclamped state into a clamped state.

In this context, a "clamping element" is to be understood as an element that, in at least one clamping state, has in particular a positive-fit connection in at least one direction relative to the battery device, and is provided to hold the battery device in the clamping state with a frictional fit. In addition to the frictional fit, the battery device can also have a positive fit in a different direction.

The clamping element can be situated on the hand-held power tool. The clamping element can be situated on the battery device. The clamping element can be clamped relative to the battery device by a gear mechanism, and in particular can form a clamped state. The clamping element can directly contact the battery device. The clamping element can be provided to hold the battery device on the hand-held power tool, in at least the clamped state. The clamping element can be provided to extend into the battery device, in particular into an acceptance region of the battery device, at least in the clamped state.

The clamping element can be provided to clamp the battery device from a direction transverse to a/the direction of acceptance of the battery device along the hand-held power tool.

In particular, the clamping unit can be formed in addition to the locking unit, so that, in a state, the clamping unit and the locking unit clamp and lock the battery device relative to the hand-held power tool.

A "clamped state" is to be understood as a state in which the clamping element clamps the battery device relative to the hand-held power tool, by for example pressing the battery device against the hand-held power tool.

An "unclamped state" is to be understood as a state in which the clamping element positions the battery device relative to the hand-held power tool in such a way that the battery device is not clamped, or has play, relative to the hand-held power tool.

In accordance with an example embodiment of the present invention, it can be useful for the clamping element to be provided to hold the battery device in the clamped state on the clamping unit, in particular the hand-held power tool, with a positive fit and/or with a frictional fit. In this way, the battery device can be held without play on the hand-held power tool.

In addition, in accordance with an example embodiment of the present invention, it can be useful for the clamping element to be mounted so as to be capable of rotational movement on the hand-held power tool, in particular on a tool housing of the hand-held power tool. The actuating element can be provided to couple the clamping element with the actuating element. The actuating element can be coupled by the clamping element in such a way that a translational movement of the actuating element causes a rotational movement of the clamping element. The clamping unit can have two clamping elements. The clamping elements can be situated opposite one another. The clamping elements can be situated at a distance from one another. The clamping elements can be provided to at least partly surround the battery device from two opposite sides.

In addition, in accordance with an example embodiment of the present invention, it can be useful for the actuating element to be pre-tensioned in the unclamped state by a spring element, in particular a pressure spring element, and to be at least partly pre-tensioned in the clamped state. In this way, it can be ensured that in an installed state the battery device is connected to the hand-held power tool.

In addition, it can be useful for the clamping element to be made with a U shape. The clamping element can have a clamping projection. The clamping projection can be provided to grasp the battery device. In this way, the battery device can be held particularly reliably.

In accordance with an example embodiment of the present invention, it is provided that the clamping element, in particular the clamping projection, be made in the shape of a wedge. The clamping element can have a clamping surface that is configured transverse to the plane of acceptance. The clamping surface can be oriented transverse to a direction of acceptance and/or to an orthogonal to a direction of acceptance of the battery device. The clamping surface can be provided to clamp in the battery device. The clamping surface can be provided to orient the battery device and to align it relative to, for example, the guide rails of the battery device. In this way, even given increasing wear, a precise positioning and pre-tensioning of the battery device can be ensured. In this way, it is also possible to achieve a clamping of the battery device from three spatial directions.

In addition, in accordance with an example embodiment of the present invention, it is provided that the clamping element be situated in at least one opening, in particular a guide opening, of the hand-held power tool, and that it grasp the battery device at least in some segments. In particular, the clamping projection can be situated in at least one opening, in particular an accepting opening, of the battery device, and can grasp the hand-held power tool in at least some segments.

The hand-held power tool can have an accepting unit in order to accept the battery device. The accepting unit can have an accepting raised part, fashioned as a guide rail, in order to accept the battery unit. The accepting unit can have an accepting opening fashioned as a guide opening. The accepting opening can be provided to accept the accepting raised part, in a plugged-in state of the battery device. The accepting raised part can be provided to hold the battery device on the hand-held power tool with a positive fit. The accepting opening can be provided in the hand-held power tool or the battery device. The accepting raised part can be provided in the hand-held power tool or the battery device.

The clamping projection can form, at least in some segments, the accepting raised part.

In addition, in accordance with an example embodiment of the present invention, it is provided that the clamping element form at least partially a guide raised part, in particular fashioned as a guide rail, in order to guide the battery device. The guide raised part can at least partly surround the clamping element. The guide raised part can limit the clamping element from two sides oriented away from one another. The clamping element can be situated between two guide raised parts, preferably in order to separate these. The clamping element can act as a prolongation of the guide raised parts.

In addition, in accordance with an example embodiment of the present invention, it is provided that the clamping element, in particular a/the clamping projection, be situated in a bearing opening of a/the guide rail, in an accepting state. The clamping element, in particular the clamping projection, can be movably mounted in the opening of the guide rail. The opening in the guide raised part can be fashioned as a recess. The opening in the guide raised part can be provided to separate a first guide raised part from a second guide raised part. The opening in the guide raised part can be provided to accept the clamping element, in particular the clamping projection, at least in a state of removal. In this way, the clamping unit can be made particularly compact.

In particular, the accepting raised part is provided in order to guide the battery device from a removed state into an accepted state.

In addition, in accordance with an example embodiment of the present invention, it can be useful for the clamping element, in particular the clamping projection, to be provided in order to enlarge an extension of a/the guide rail in a clamped-in state of the battery device, in particular to enlarge it transverse to a direction of insertion of the battery device. In this way, a reliable accepting of the battery device can be enabled.

In addition, in accordance with an example embodiment of the present invention, it can be useful for the clamping element to be capable of being displaced from an unclamped state into a clamped state relative to the actuating element by a knee lever unit. The knee lever unit can be operatively connected to the actuating element. In addition, it can be useful for the knee lever unit to have a knee lever element that connects the actuating element and the clamping element, and is mounted so as to be movable relative to these. The knee lever element can be mounted so as to be movable relative to the clamping element and/or the actuating element. The knee lever element can be provided to convert a movement, in particular a translational movement, of the actuating element into a movement, in particular a rotational and/or translational movement, of the clamping element. The knee lever element is mounted so as to be capable of rotation relative to the actuating element, in particular about a first actuation axis of rotation, and/or relative to the clamping element, in particular about a clamping axis of rotation. The clamping axis of rotation and the actuation axis of rotation can be situated at a distance from one another and in particular parallel to one another. In this way, a large stroke path, given a small tensile or pressure force, can be converted into a small stroke having a large force, or vice versa.

A circular eccentric disc that clamps the clamping element relative to the actuating element would also be possible.

In accordance with an example embodiment of the present invention, it is provided that two clamping elements be provided that symmetrically grasp the battery device preferably at least in some segments, and in particular act counter to one another. Alternatively, it can also be provided that the clamping elements grasp the battery device non-symmetrically, preferably at least in some segments.

In addition, in accordance with an example embodiment of the present invention, it is provided that the clamping element clamps the battery device with a frictional fit transversely, in particular perpendicular, to the direction of acceptance of the battery device.

In addition, an example embodiment of the present invention relates to a battery device having a locking unit that has a locking element, in particular a snap element, for locking the battery device to a hand-held power tool, and a clamping unit.

In addition, an example embodiment of the present invention relates to a hand-held power tool, in particular a hammer drill, having an accepting unit, fashioned as an accepting rail, for the detachable acceptance of a battery device, and a clamping unit, as disclosed herein.

In addition, an example embodiment of the present invention relates to a hand-held power tool system having a hand-held power tool and a battery device, including a clamping unit and a locking unit for locking the battery device to a hand-held power tool.

In accordance with an example embodiment of the present invention, it can be useful for the locking unit to have an unlocking element, in particular an unlocking button, that is provided to unlock the locking unit, the unlocking element being surrounded by the actuating element in a clamped state.

The actuating unit, the locking unit, and/or the clamping unit may be situated in the hand-held power tool or in the battery device, and in particular form a part thereof.

BRIEF DESCRIPTION OF THE DRAWINGS

Further advantages result from the following description of the figures. The figures shows exemplary embodiments of the present invention. The figures and the description herein contain numerous features in combination. The person skilled in the art will usefully also consider the features individually and will combine them to form appropriate further combinations, in view of the disclosure herein.

In the Figures, identical components are provided with the same reference characters.

DETAILED DESCRIPTION OF EXAMPLE EMBODIMENTS

Figure 1:
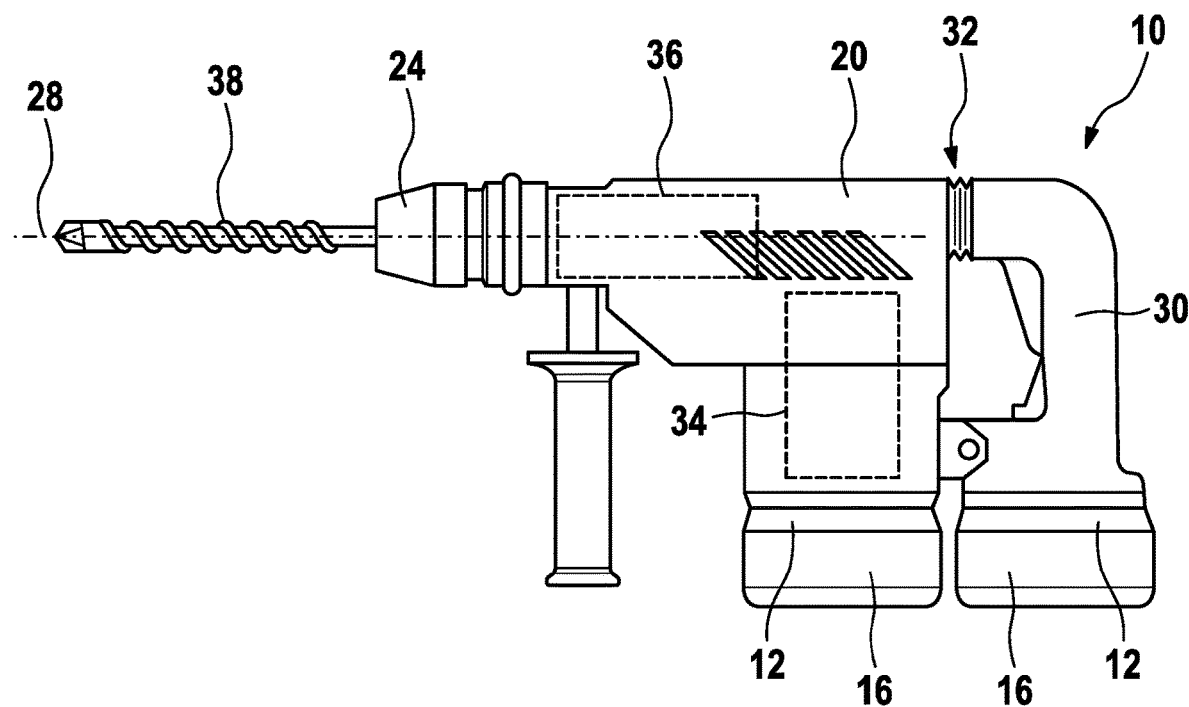
FIG. 1 shows an exemplary plan view of a hand-held power tool, in accordance with an example embodiment of the present invention.
Figure 2:
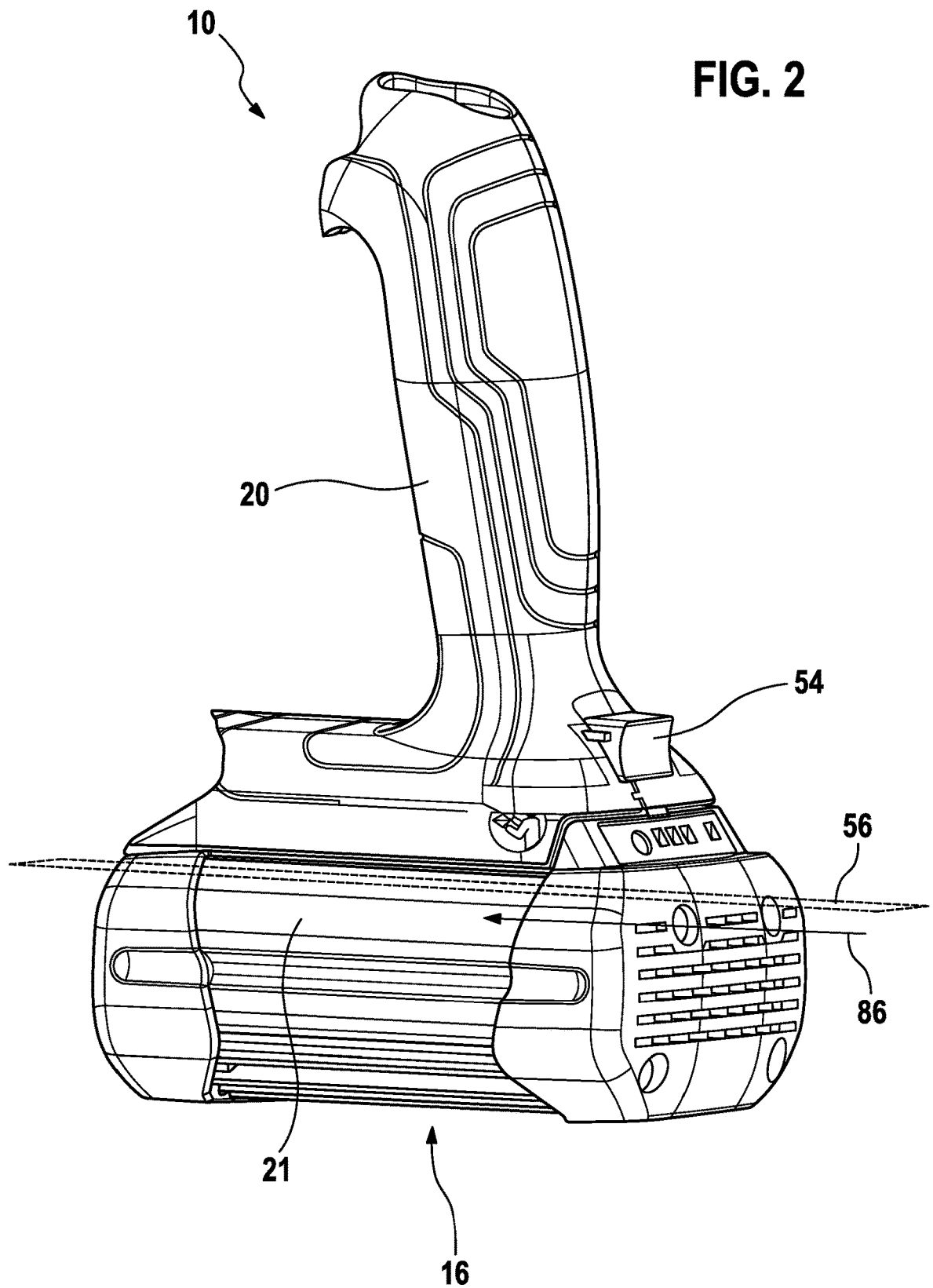
FIG. 2 shows a perspective detail of the hand-held power tool of FIG. 1.

FIG. 1 shows a hand-held power tool 10. In the depicted exemplary embodiment, hand-held power tool 10 is formed by a hammer drill and chisel. However, it is also possible for hand-held power tool 10 to have some other realization considered appropriate by a person skilled in the art (in view of the disclosure herein), such as for example as a drill, a grinder, a garden tool, a breaking hammer, or the like. Hand-held power tool 10 has a housing 20. A handle 30 of hand-held power tool 10 is situated on housing 20. Handle 30 is made so as to be dampened relative to housing 20. A damping unit 32 is situated between housing 20 and handle 30. In addition, handle power tool 10 has a drive unit 34 and an impact mechanism device 36. Drive unit 34 and impact mechanism device 36 are situated in housing 20. Drive unit 34 and impact mechanism device 36 are surrounded by housing 20. In addition, hand-held power tool 10 has a tool receptacle 24. Tool receptacle 24 is situated on a side of housing 20 situated opposite handle 30. Tool receptacle 24 is fashioned as a quick-change tool receptacle 24. Tool receptacle 24 is provided in order to accept a quick-change tool 38. Tool receptacle 24 is fashioned as an SDS tool receptacle 24, such as an SDS-max tool receptacle 24. Tool receptacle 24 is provided in order to accept a quick-change tool 38 having a shaft diameter of more than 10 mm. Quick-change tool 38 is formed by a drill bit. In addition, tool receptacle 24 has an axis of rotation 28. Axis of rotation 28 corresponds to an axis of rotation of tool receptacle 24 during operation, and extends substantially parallel to a main direction of extension of hand-held power tool 10.

Handle 30 is situated on a side of housing 20 oriented away from a processing region of hand-held power tool 10. Handle 30 is provided in order to guide hand-held power tool 10 and to transmit force from an operator to hand-held power tool 10. In addition to handle 30, hand-held power tool 10 has a detachable additional handle. The additional handle can be fastened to housing 20 of hand-held power tool 10, in particular in a region close to tool receptacle 24, via a locking connection or some other connection considered appropriate by a person skilled in the art.

Drive unit 34 of hand-held power tool 10 is provided in order to produce a drive torque and to produce an impact pulse via impact mechanism device 36, and is realized as an electric motor. Via a driven unit (not shown) of hand-held power tool 10, a drive torque of drive unit 34 can be transmitted to impact mechanism device 36 at least in order to produce an impact pulse. An impact pulse of impact mechanism device 36 can be produced in a conventional manner. Via the driven unit, the drive torque can be transmitted to tool receptacle 24, in a conventional manner, in order to produce a rotational movement of quick-change tool 38 via a guide element (not shown) 78, 80, realized as a hammer tube, of impact mechanism device 36, and/or via a rotational entraining element (not shown), situated on tool receptacle 24, of impact mechanism device 36.

In addition, hand-held power tool 10 has a battery device 16. Battery device 16 is formed by a battery pack. Battery device 16 is formed by a lithium-ion battery pack. Battery device 16 preferably includes a plurality of battery cells.

Figure 13:
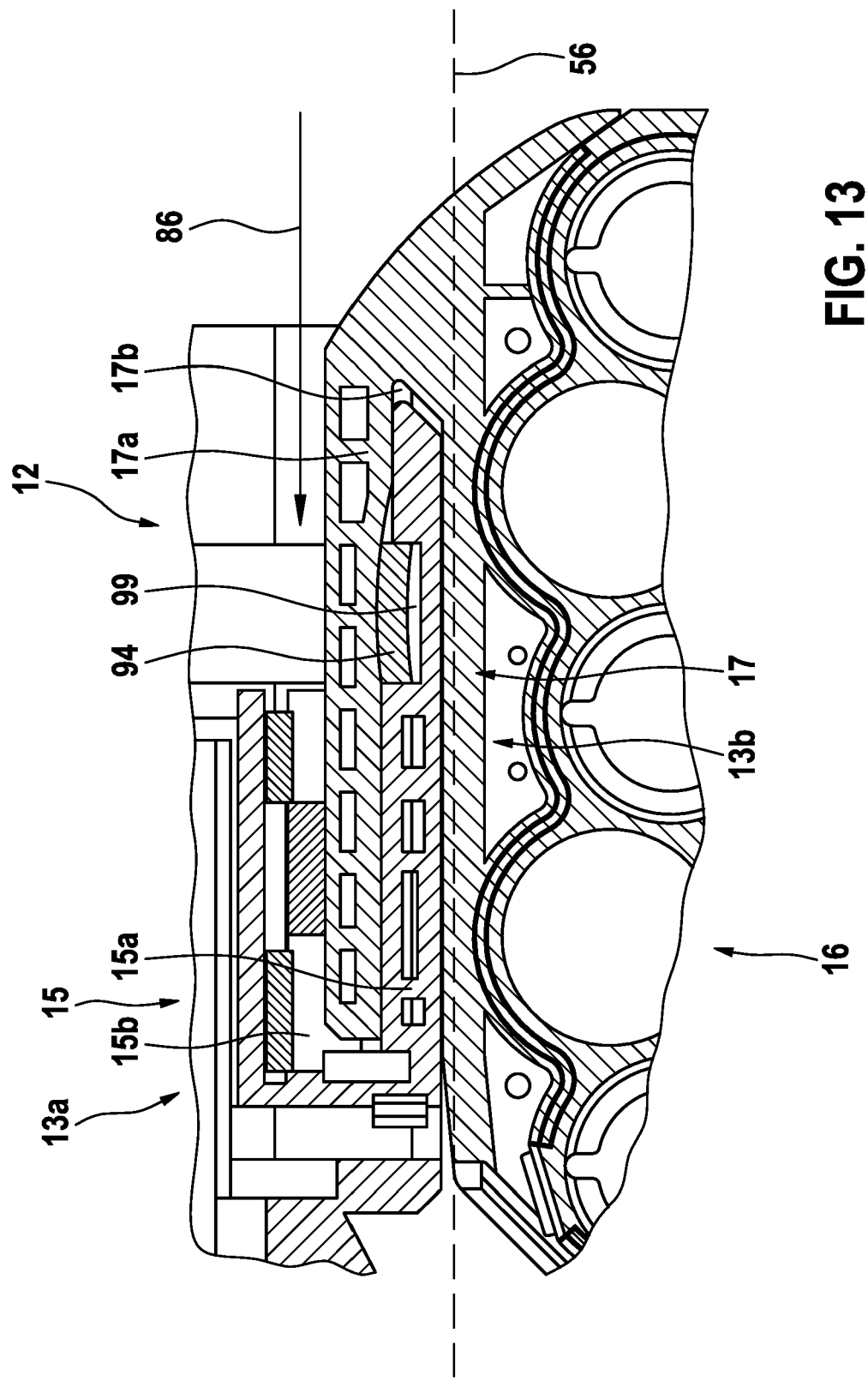
FIG. 13 shows a further section through an interface unit of a development of the hand-held power tool.

In addition, an interface unit 12 is provided (FIG. 13). Interface unit 12 has a tool interface 13a allocated to the hand-held power tool, and has a battery interface 13b allocated to battery device 16. Tool interface 13a is situated in a central region of hand-held power tool 10. Interface unit 12 is provided for a mechanical accepting of battery device 16. Battery device 16 is provided to be accepted in tool interface 13a or coupled to tool interface 13a, in particular by battery interface 13b. Battery device 16 is capable of being accepted so as to be capable of being detachably coupled to hand-held power tool 10, by interface unit 12. In addition, interface unit 12 has an electrical contact unit for an electrical contacting with battery device 16 accepted thereon. The electrical contacting unit has a plurality of electrical contacts. Battery device 16 likewise has an electrical contact unit for an electrical contacting with battery device 16. The electrical contact unit of battery device 16 likewise has a plurality of electrical contacts. Via the contact units, a quantity of energy can be transmitted from battery device 16 to battery interfaces 12, and/or a battery device 16 can be encoded for a hand-held power tool.

Tool interface 13a has a tool guide unit 15. Tool guide unit 15 includes a guide raised part 15a and a guide opening 15b. Guide raised part 15a is fashioned as a guide rail and is provided to guide battery device 16 on hand-held power tool 10. Tool guide unit 15 has two guide raised parts 15a that are situated opposite one another, in particular oriented toward one another. Guide raised parts 15a are configured parallel to one another. In this specific embodiment, guide raised parts 15a are oriented substantially parallel to axis of rotation 28 of tool receptacle 24. Guide raised parts 15a define a plane of acceptance 56 for accepting battery device 16 in battery interface 12. Guide opening 15b is limited by guide raised part 15a. Guide opening 15b is provided to accept a part of battery device 16 and to hold the battery device with a positive fit on hand-held power tool 10 via guide raised part 15a. Guide unit 15 limits hand-held power tool 10 at least in some segments. Guide raised parts 15a extend parallel to plane of acceptance 56.

Battery interface 13b has a battery guide unit 17. Battery guide unit 17 is fashioned substantially analogously to tool guide unit 15. Battery guide unit 17 has a guide raised part 17a and a guide opening 17b. Guide raised part 17a is fashioned as a guide rail and is provided to guide battery device 16 in battery interface 16b. Battery guide unit 17 has two guide raised parts 17a oriented away from one another. Guide raised parts 17a are configured parallel to one another. Guide raised parts 17a are provided to engage in guide openings 17b of tool guide unit 15 and to slide along guide raised parts 15a of tool guide unit 15, or to be held with a positive fit by guide raised parts 15a. Guide unit 17 limits battery device 16 at least in some segments. Battery interface 12 is preferably fashioned as a groove-spring connection by which battery device 16 can be accepted in hand-held power tool 10.

Figure 3:
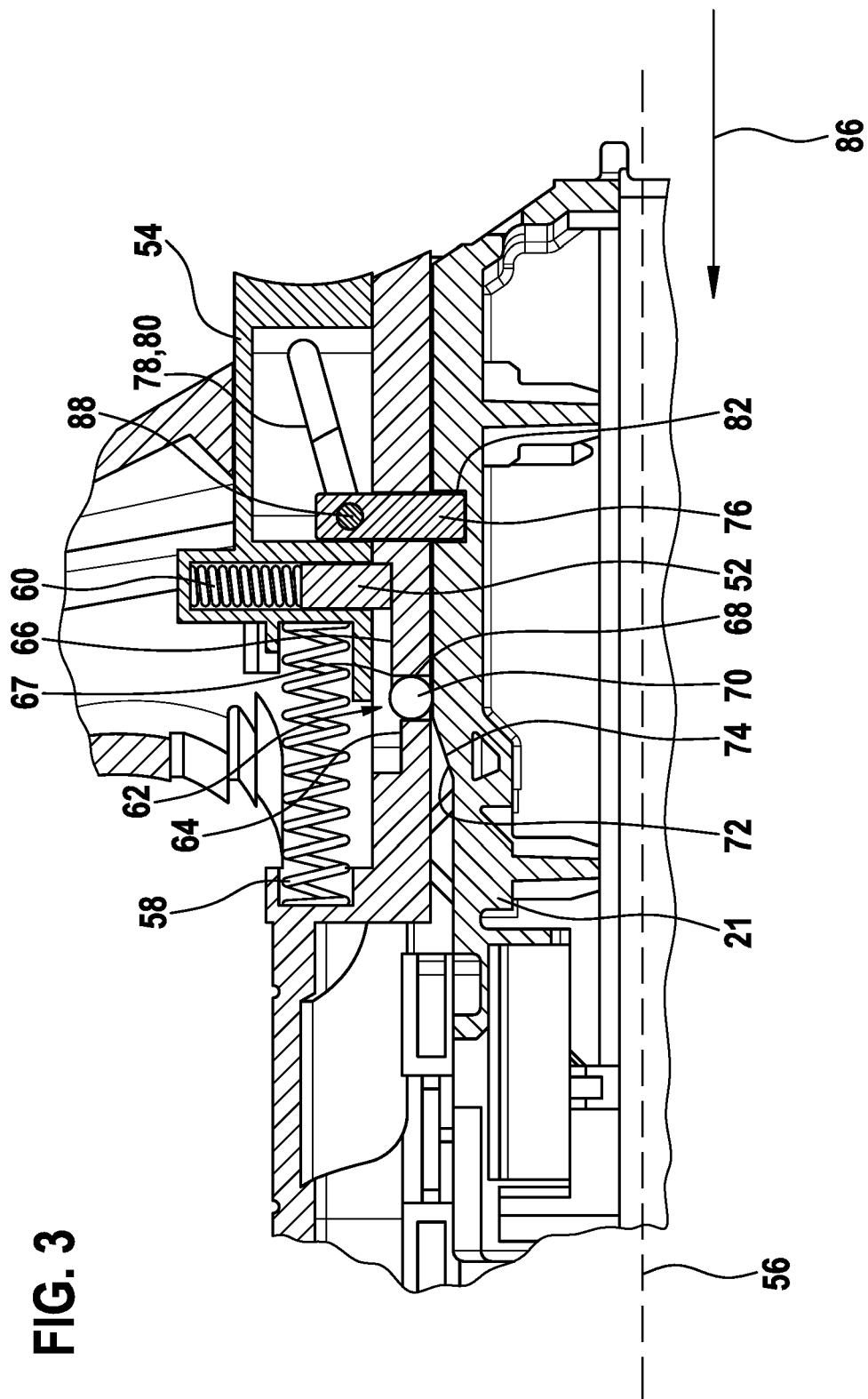
FIGS. 3 to 5 each show a section through an interface unit of the hand-held power tool of FIG. 2, FIGS. 6 to 8 each show a section through an interface unit of a development of the hand-held power tool of FIG. 2.
Figure 4:
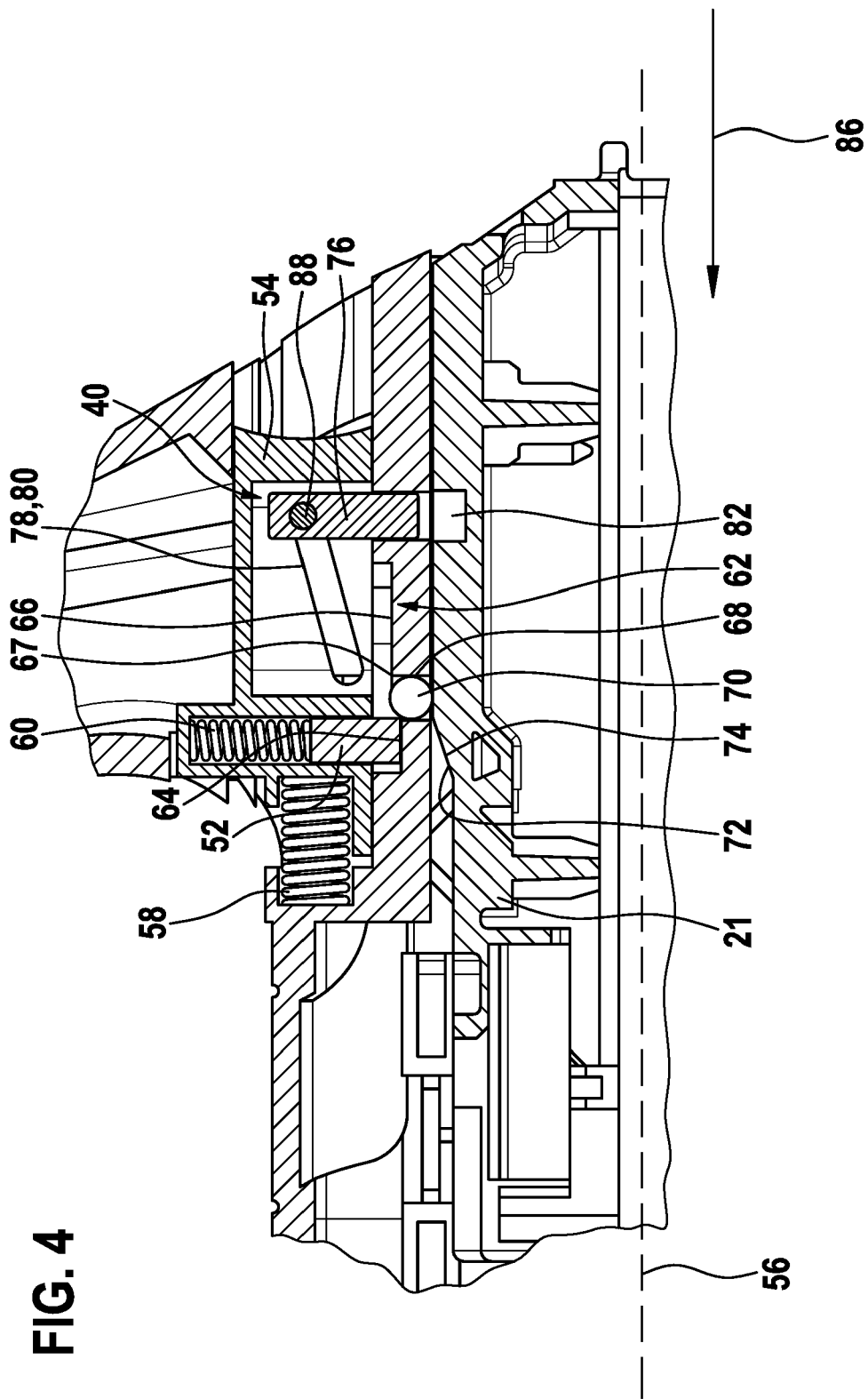
Figure 5:
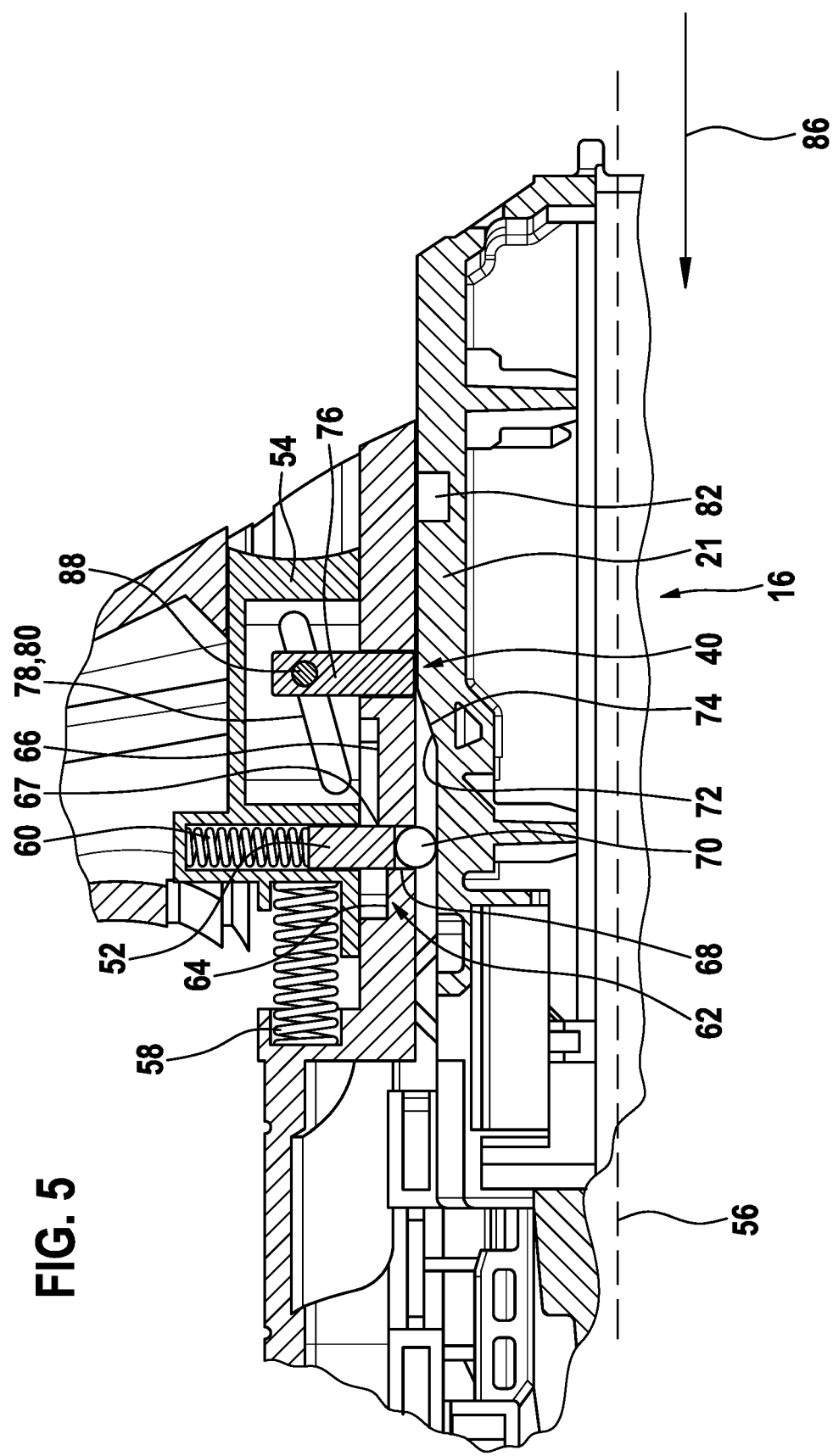
Figure 6:
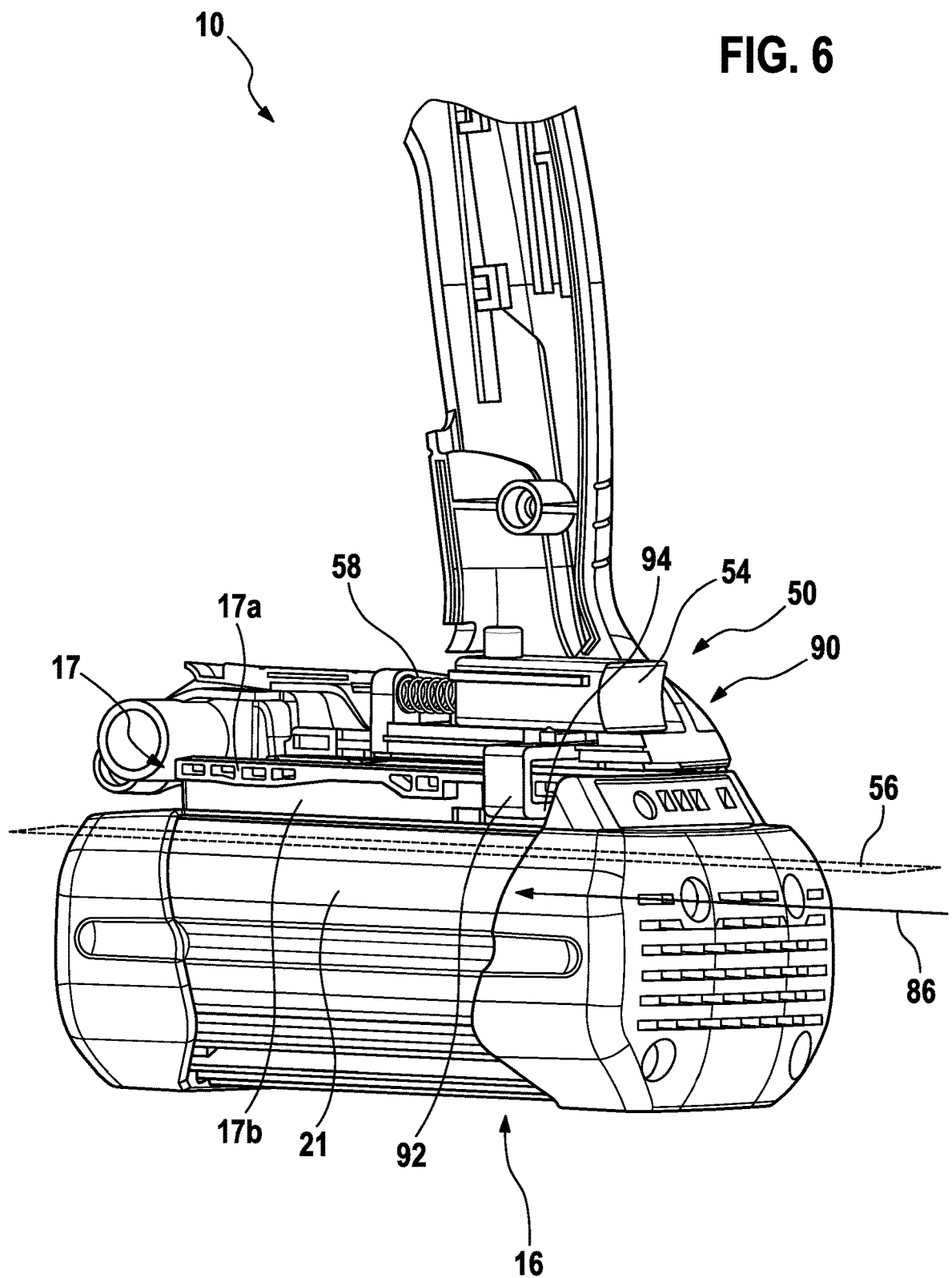
Figure 7:
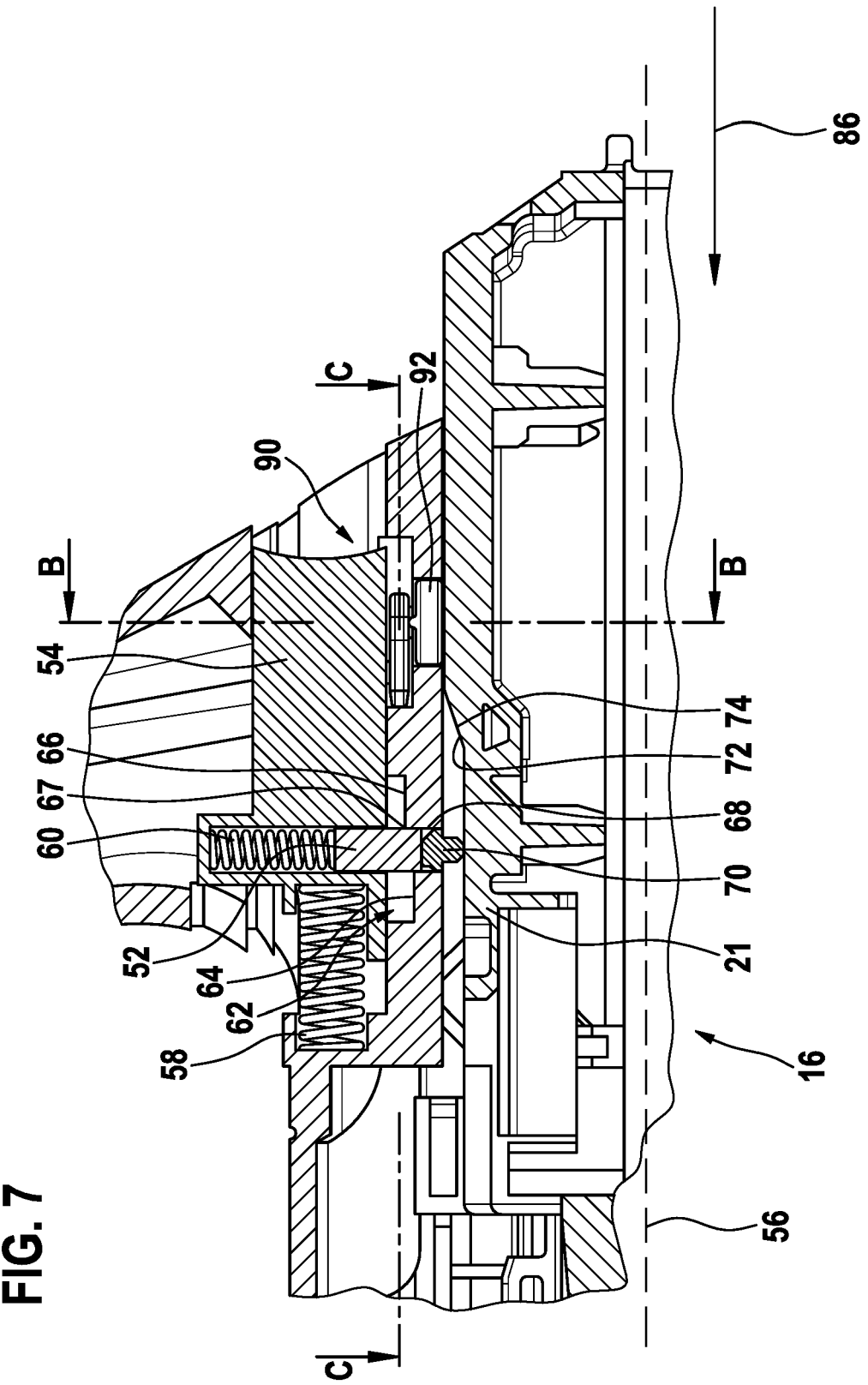
Figure 8:
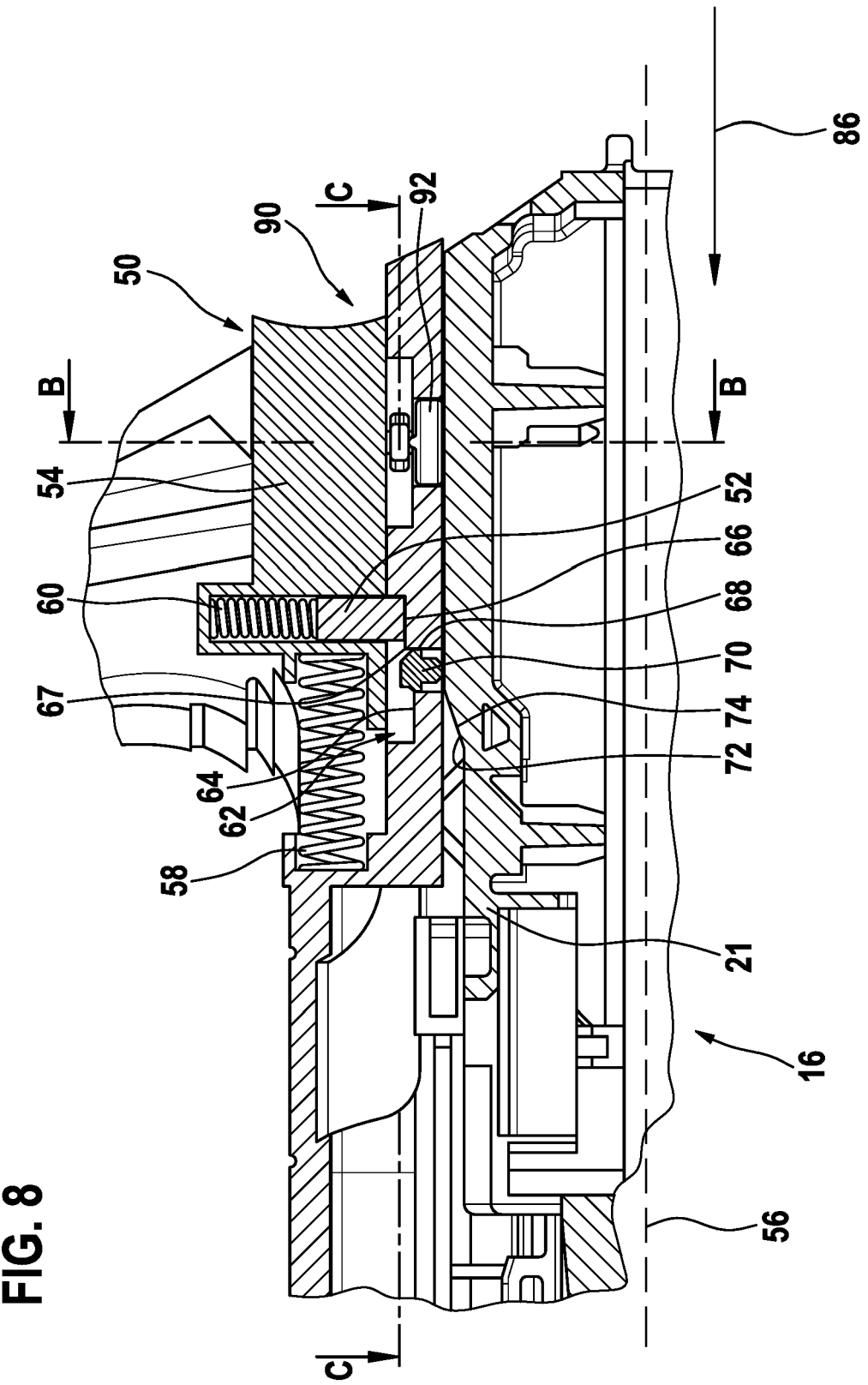
Figure 9:
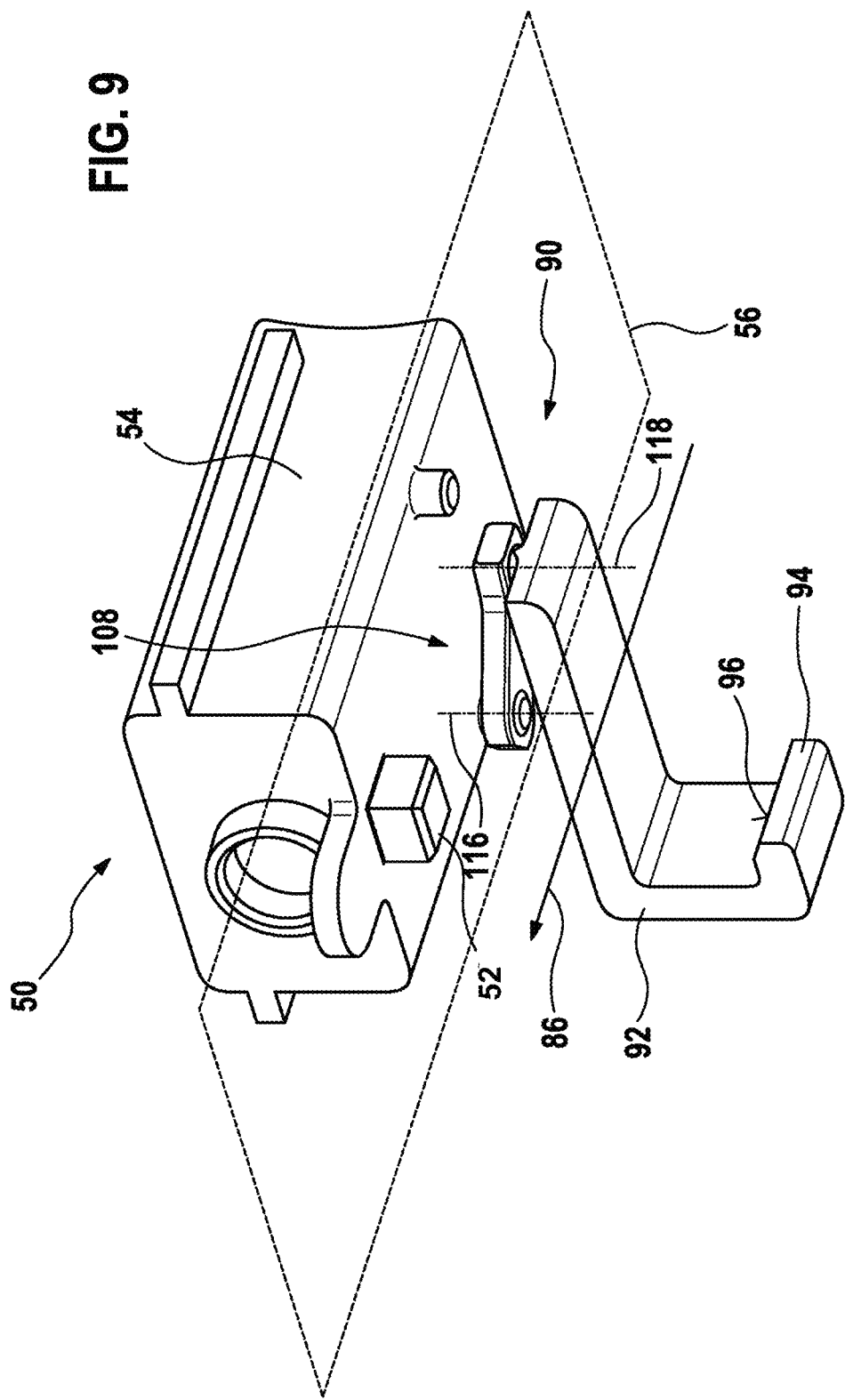
FIG. 9 shows a part of a hand-held power tool from FIG. 6 through FIG. 8.
Figure 10:
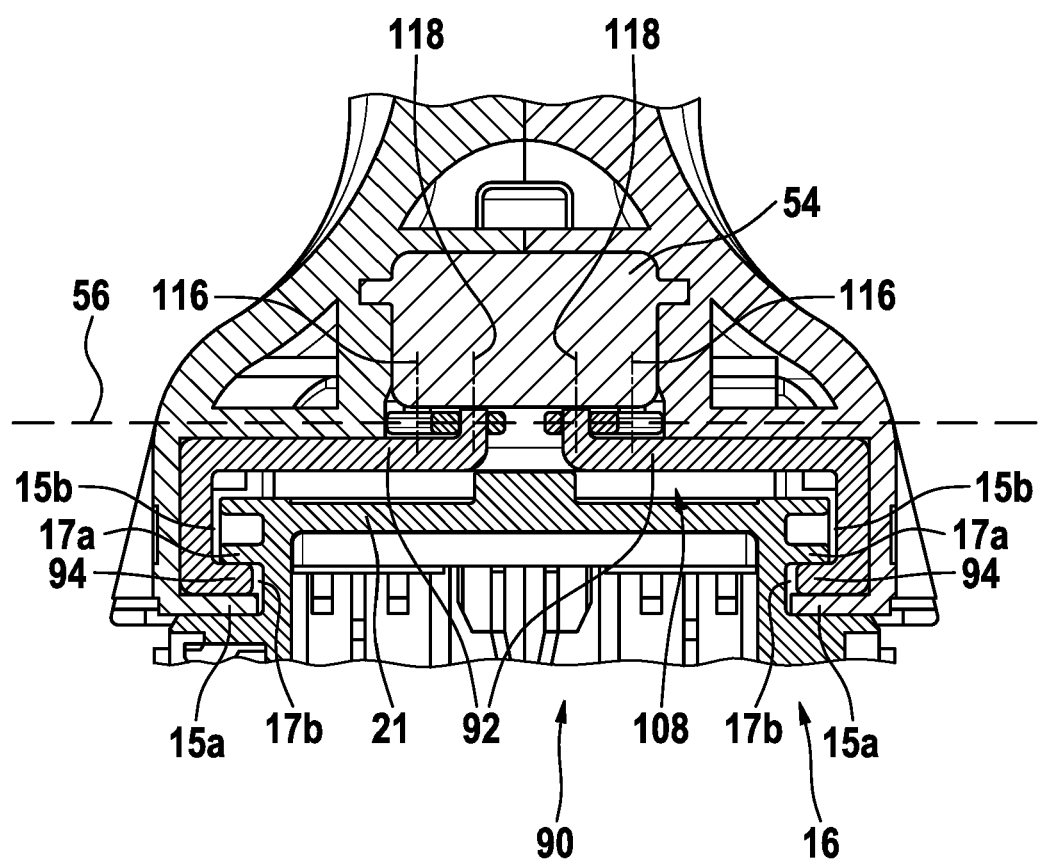
FIGS. 10 to 12 each show a further section through an interface unit of a development of the hand-held power tool of FIG. 2.
Figure 11:
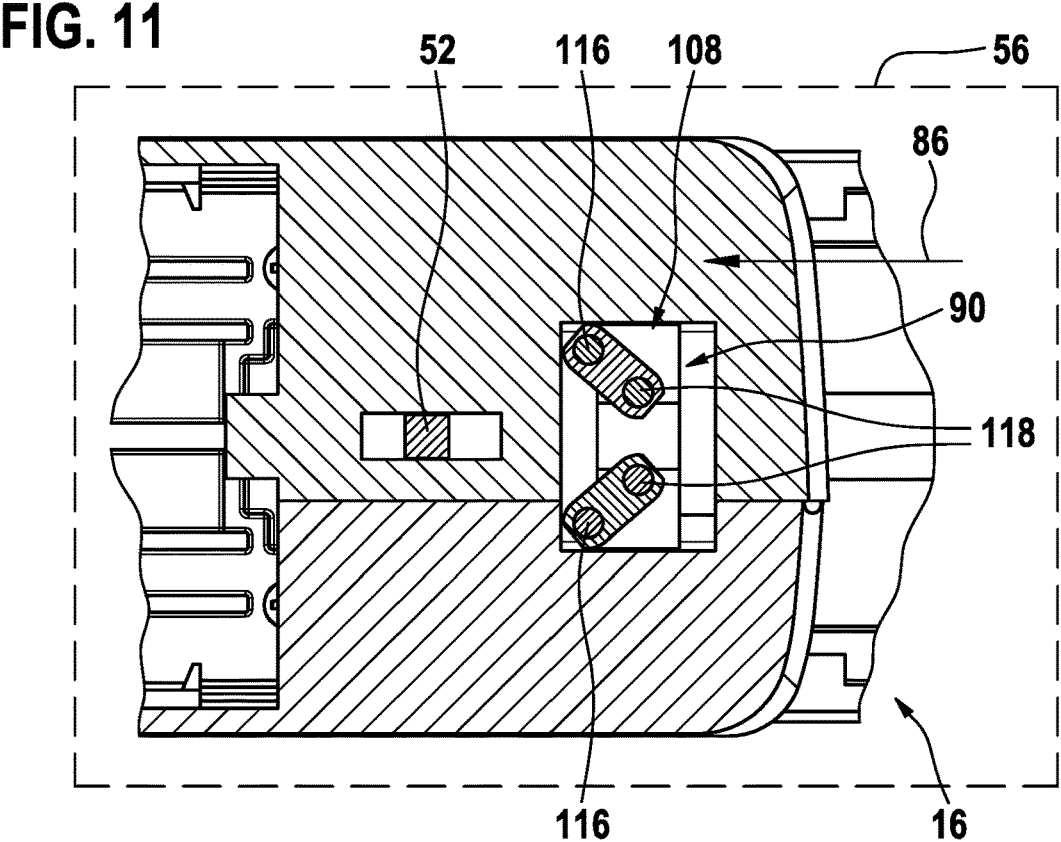
Figure 12:
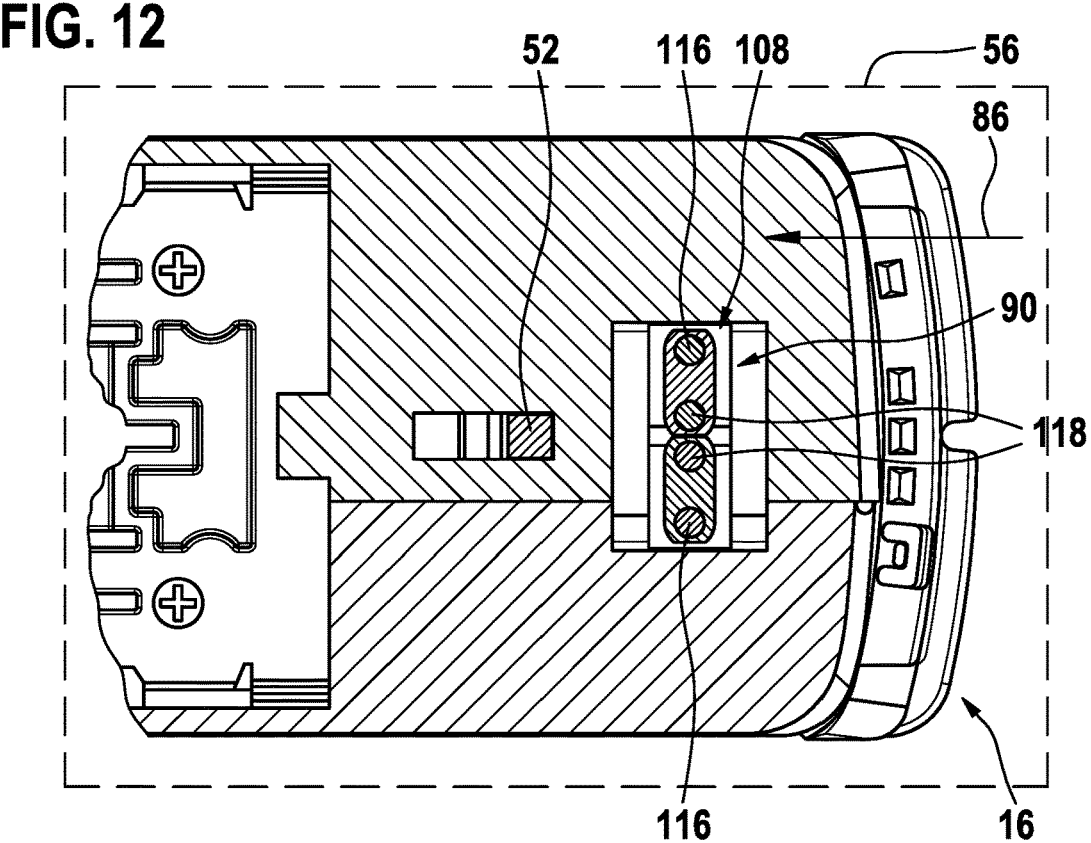

Hand-held power tool 10 has a locking unit 40; cf. FIGS. 3 to 5, which Figures show a section perpendicular to plane of acceptance 56 in which various states of locking unit 40 are shown. Locking unit 40 is fashioned as a snap unit or as a clip unit that is preferably movable against the action of a spring force. Preferably, the snap unit has a first tensioned operating state and a second non-tensioned or partly tensioned operating state. Preferably, when no battery device 16 is accepted on hand-held power tool 10, the snap unit is in this non-tensioned or partly tensioned state. Locking unit 40 is used to hold battery device 16 on hand-held power tool 10.

Hand-held power tool 10 according to the present invention has an actuating unit 50 for releasing a battery device 16 for a hand-held power tool 10, having a locking element 52 for locking actuating unit 50, and having an actuating element 54 that is provided to move locking element 52 from a retaining state into a release state of actuating unit 50; cf. FIGS. 2 to 10.

Of course, actuating unit 50 can also be provided in a battery device 16, and corresponding features, for example attributed to hand-held power tool 10 in the described specific embodiments, can be provided in battery device 16, or vice versa.

Locking element 52 is held with a positive fit and/or a frictional fit in the release state, whereby battery device 16 can particularly advantageously be released from hand-held power tool 10 in that actuating unit 50 is actuated via actuating element 54 on hand-held power tool 10.

Via the release state of actuating unit 50, a bistable state can be reached in which actuating element 54, in a state of actuation, remains at least for a limited time in the release state. In this way, battery device 16 can be removed from hand-held power tool 10 in that an operator grasps battery device 16 and easily withdraws it from a receptacle unit that accepts battery device 16 of hand-held power tool 10.

Actuating element 54 is provided to be displaced from the retaining state into the release state via an actuation by, for example, an operator. Conversely, actuating element 54 can be provided to be displaced by battery device 16 from the release state into the retaining state via an actuation, such as for example when there is an acceptance process of battery device 16.

In addition to the hammer drills, in particular screwdrivers, circular saws, or other tools that are considered appropriate by a person skilled in the art may be used as hand-held power tools in the sense of the present invention.

Locking element 52 is fashioned as a locking bolt, and in particular as a securing pin. Locking element 52 is provided to limit, or to lock, with a positive fit a relative movement of actuating element 54, at least in a release state. Locking element 52 is mounted so as to be movable relative to actuating element 54. Locking element 52 is mounted with a pre-tension, or is spring-loaded, relative to actuating element 54. Locking element 52 is mounted so as to be movable along a first direction of movement. Actuating element 54 is mounted so as to be movable along a second direction of movement. The second direction of movement is at least substantially oriented in the direction of a plane of acceptance 56 for accepting battery device 16 in hand-held power tool 10. The first direction of movement can be oriented transverse, in particular perpendicular, to the second direction of movement.

In at least the release state, actuating element 54 is pre-tensioned by a first spring element 58 in order to exert a force on actuating element 54 and/or locking element 52, and to displace actuating element 54 from the release state into the retaining state. First spring element 58, 60 is tensioned in the release state. In the retaining state, first spring element 58 is partly tensioned or is not tensioned.

In at least the release state, locking element 52 is pre-tensioned by a second spring element 60 in order to exert a force on locking element 52 and to hold locking element 52 in the release state with a frictional fit and with a positive fit. Actuating unit 50 can be held in the release state by a force of first spring element 58 and a force of second spring element 60. First spring element 58 and second spring element 60 can be fashioned as a tension spring or pressure spring, or as some other spring element considered appropriate by a person skilled in the art.

Actuating unit 50 has a control element 62 fashioned as a control groove, which is provided to hold locking element 52 in a release state, or a retaining state, via first and second spring element 58, 60. Control groove 62 has a stop surface 67 that is provided to hold locking element 52 in the release state with a positive fit and/or with a frictional fit. Control groove 62 is fashioned as a guide groove that is provided in particular to guide locking element 52. Control groove 62 is provided to limit a relative movement of locking element 52 with a positive fit, via stop surface 67. Control groove 62 is situated in a housing 20 of hand-held power tool 10. Control groove 62 has two guide surfaces 64, 66. Guide surfaces 64, 66 are oriented parallel to and at a distance from one another. Guide surfaces 64, 66 are separated by stop surface 67, which is configured perpendicular to at least one of the two guide surfaces 64, 66.

Actuating unit 50 has a perforation 68 in which locking element 52 is situated. Perforation 68 can be provided in order to connect the interior of hand-held power tool 10 to the region exterior to hand-held power tool 10. Perforation 68 is provided to accept and to hold locking element 52 in hand-held power tool 10. Perforation 68 is provided to bear locking element 52 in such a way that in the release state locking element 52 stands out from tool housing 20, and in the retaining state does not stand out relative to tool housing 20. Perforation 68 has a circular cross-section or a polygon-shaped cross-section, such as for example a rectangular or square cross-section.

Locking element 52 can be displaced from the release state into the retaining state as a function of a relative movement of an acceptance process of battery device 16. Battery device 16 is provided to indirectly contact locking element 52 in order to actuate it in such a way that locking element 52 is displaced from the release state into the retaining state.

Actuating unit 50 has a coupling element 70 that is provided to contact locking element 52 in the release state. In at least one state, coupling element 70 is situated in control groove 62. Coupling element 70 is mounted so as to be movable relative to locking element 52 and/or control groove 62. Coupling element 70 is mounted so as to be movable relative to actuating element 54. In the release state, a relative movement of coupling element 70 is limited by locking element 52 and battery device 16. Coupling element 70 is provided to immediately contact locking element 52 and/or battery device 16 in at least the release state.

Actuating unit 50 can have at least two release states that hold locking element 52 in a release state. In a first release state, locking element 52 is held with a positive fit and/or with a frictional fit relative to coupling element 70. In a second release state, locking element 52 is held with a positive fit and/or with a frictional fit relative to stop surface 67 of control groove 62. In the first release state, locking element 52 is pre-tensioned by first spring element 58, 60, than in the second release state.

In the first release state, a relative movement of coupling element 70 is limited by battery device 16. In the second release state, a relative movement of coupling element 70 is limited by locking element 52.

Coupling element 70 is provided to displace locking element 52 from the release state into the retaining state. In an accepting state, coupling element 70 acts counter to the spring action of second spring element 58, 60, in order to displace locking element 52 from the release state into the retaining state.

Battery device 16 has a triggering element 72 that is provided to exert a triggering force indirectly or directly on locking element 52 in such a way that locking element 52 is capable of being displaced from a release state into a retaining state. Locking element 52 is capable of being displaced from the release state into the retaining state by the triggering force acting on actuating element 54. Triggering element 72 can be fashioned as a housing 20 of battery device 16. Triggering element 72 can be fashioned as a triggering raised part 74. Triggering element 72 is fashioned as a triggering contour, in particular a triggering surface, that actuates the coupling element when there is an acceptance movement, in particular an insertion movement. Triggering element 72 is fashioned as a wedge-shaped triggering raised part 74. Coupling element 70 is provided to exert a triggering force on locking element 52 in such a way that locking element 52 is capable of being displaced from a release state into a retaining state. The triggering force works counter in particular to second spring element 58, 60 in order to displace locking element 52 from the release state into the retaining state. Locking element 52 can be displaced from the release state into the retaining state by the triggering force acting on actuating element 54. Coupling element 70 is provided to move coupling element 70, via a battery device 16 that is movable relative to coupling element 70, in such a way that coupling element 70 exerts a triggering force on locking element 52.

Coupling element 70 is situated on a side of locking element 52 facing away from second spring element 60. Coupling element 70 is ball-shaped or cone-shaped, and is mounted so as to be movable at least relative to locking element 52. Coupling element 70 can have a T-shaped or a rectangular cross-section, and can be made at least substantially in the shape of a bolt.

Hand-held power tool 10 has in addition a locking unit 40 for locking a battery device 16 to hand-held power tool 10 with a locking element 76 for the locking of battery device 16, in particular with a positive fit, relative to hand-held power tool 10. Locking element 76 is mounted so as to be movable relative to actuating element 54, which is provided to move locking element 76 from a locked state into an unlocked state of locking unit 40. Locking element 76 is coupled to actuating element 54.

Locking element 76 is fashioned in the form of a slidable or pivotable lock.

Actuating element 54 has a first guide element 78 fashioned as guide groove 78, which is provided to move locking element 76 from a locked state into an unlocked state. Actuating element 54 is provided to displace locking element 76 from an unlocked state into a locked state or vice versa, via an actuation of actuating element 54.

Guide groove 78 is provided to couple actuating element 54 to locking element 76. Guide groove 78 is provided to exert a compulsory force on locking element 76 in order to displace locking element 76 from an unlocked state into a locked state.

Locking unit 40 has a locking opening 82 that is provided in battery device 16. Locking opening 82 is fashioned as a locking recess, and is situated in battery housing 21 of battery device 16. Battery housing 21 is fashioned as an external housing, and accepts and holds the battery cells of battery device 16. Locking opening 82 extends perpendicular relative to a plane of acceptance 56 and to a direction of acceptance 86 of battery device 16.

Locking element 76 is fashioned as a locking bolt and has a circular square cross-section. Locking element 76 is provided to be connected with a positive fit to battery device 16 in order to hold battery device 16 with a positive fit opposite a direction of acceptance 86 of battery device 16, in or on hand-held power tool 10, and to prevent a movement of battery device 16 in a locked state of locking unit 40. Actuating unit 50 is provided to lock locking element 76 as a function of a path of acceptance, in particular an insertion path, of battery device 16 into hand-held power tool 10.

Locking unit 40 is fashioned as a snap connection. Locking element 76 is fashioned as a snap element.

Locking element 76 is mounted so as to be movable relative to tool housing 20 of hand-held power tool 10 and relative to actuating element 54. Locking element 76 is mounted so as to be movable from an unlocked state into a locked state, perpendicular to a plane of acceptance 56.

Tool housing 20 limits a first relative movement of locking element 76, and actuating element 54 limits a second relative movement of locking element 76, the first relative movement being oriented transverse to the second relative movement.

At least in the locked state, locking element 76 stands out relative to tool housing 20 of hand-held power tool 10. In an alternative specific embodiment, locking element 76 can, at least in the locked state, stand out from battery device 16, in particular a battery housing 21 of battery device 16.

Locking unit 40 has a second guide element 80, fashioned as guide groove 80. Second guide groove 80 extends at least substantially transverse, in particular perpendicular, to first guide groove 78. Second guide groove 80 is situated in or on tool housing 20 of hand-held power tool 10. Guide grooves 78, 80 are each fashioned as oblong holes, and each extend in a straight line. Second guide groove 78, 80 extends transverse, in particular perpendicular, to plane of acceptance 56 of battery device 16. First guide groove 78 extends substantially in the direction along plane of acceptance 56.

Locking element 76 is mounted, by a guide pin 88 fashioned as a transverse securing pin, on first guide groove 78 and second guide groove 80. Guide grooves 78, 80 are provided to bring about a relative movement of locking element 76 relative to hand-held power tool 10 in order to enable application of a compulsory movement to guide pin 88. Guide pin 88 is mounted so as to be capable of rotation relative to guide element 78, 80.

Locking element 76 is movably mounted perpendicular to plane of acceptance 56 of battery device 16.

In addition, it can be useful for actuating element 54 to be fashioned as an actuating button. Actuating element 54 is provided to displace locking element 76 from a release state of actuating unit 50 into an unlocked state. Actuating element 54 is provided to displace locking element 76, in a retaining state, into a locked state.

In an alternative specific embodiment, actuating unit 50 and/or locking unit 40 can be provided in battery device 16 so that locking unit 40 can connect battery device 16 to hand-held power tool 10, analogous to the features described above. In this way, hand-held power tool 10 could be realized particularly compactly.

Hand-held power tool 10 has a clamping unit 90 for clamping a battery device 16 to a hand-held power tool 10, having a clamping element 92 for clamping battery device 16. Clamping element 92 is mounted so as to be movable relative to actuating element 54, which is provided to move clamping element 92 from an unclamped state into a clamped state of clamping unit 90.

Actuating element 54 is provided to displace clamping element 92 from the clamped state into the unclamped state, via a translational relative movement.

Clamping element 92 is situated on hand-held power tool 10. In an alternative specific embodiment, clamping element 92 can be situated on battery device 16. Clamping element 92 is clamped by a gear mechanism relative to battery device 16, and forms a clamped state. Clamping element 92 contacts battery device 16 directly. Clamping element 92 is provided to hold, in at least the clamping state, battery device 16 on hand-held power tool 10. Clamping element 92 is provided, in at least the clamping state, to extend into battery device 16, in particular into an acceptance region of battery device 16.

Clamping element 92 is provided to hold battery device 16 on hand-held power tool 10 with a positive and/or frictional fit in the clamped state. Clamping element 92 is mounted on tool housing 20 of hand-held power tool 10 so as to be capable of rotational movement, and is coupled to actuating element 54.

Actuating element 54 is coupled by clamping element 92 in such a way that a translational movement of actuating element 54 causes a rotational and translational movement of clamping element 92. In order to improve a clamping, clamping unit 90 has two clamping elements 92 that are situated opposite one another and at a distance from one another; cf. FIG. 10 and section B-B in FIG. 8. Clamping elements 92 can be provided to at least partly surround battery device 16 from two sides situated opposite one another. Actuating element 52 is pre-tensioned by a spring element 58, fashioned as a pressure spring element, in the unclamped state, and in the clamped state is at least partly pre-tensioned.

That is clamping element 92 is fashioned U-shaped and has a clamping projection 94 that is provided to grasp battery device 16. Clamping element 92 is made U-shaped that to accept a battery device 16. Clamping element 92 is preferably fashioned as a stamped sheet metal flexible part.

Clamping projection 94 is fashioned in the shape of a wedge. Clamping projection 94 has a clamping surface 96 that extends transverse to plane of acceptance 56 and that is provided to clamp battery device 16. Clamping surface 96 is provided to orient battery device 16 and to align it relative to, for example, the guide rails of battery device 16. The clamping surface is oriented transverse to the direction of acceptance and transverse to an orthogonal to the direction of acceptance of the battery device. Clamping projection 94 is situated in an opening, fashioned as guide opening 15b, of hand-held power tool 10, and grasps battery device 16 at least in some segments.

Clamping projection 94 can form the accepting raised part at least in some segments. Clamping projection 94 forms, at least partly, a guide raised part 15a, fashioned as a guide rail, for guiding battery device 16. Guide raised part 15a at least partly surrounds clamping projection 94. Guide raised part 15a limits clamping projection 94 from two sides facing away from each other. Clamping projection 94 is situated between two guide raised parts 15a in order preferably to separate or space these from one another. Clamping projection 94 acts as a prolongation of guide raised parts 15a. In an acceptance state, clamping projection 94 is situated in a mounting opening 99 of guide raised part 15a, fashioned as a guide rail. Clamping projection 94 is mounted movably in the opening of guide raised part 15a. The opening is made as a recess in guide raised part 15a, and is provided to separate a first guide raised part 15a from a second guide raised part 15a. The opening in guide raised part 15a is provided to accept clamping element 92, in particular clamping projection 94, at least in a removed state of battery device 16. Guide raised part 15a is provided for the guiding of battery advice 16 from a removed state to an accepted state. Clamping projection 94 is provided to enlarge an extension of a/the guide rail in a clamped state of battery device 16, in particular transverse to a direction of insertion of battery device 16.

Guide raised part 15a of tool guide unit 15 is fashioned as a guide rail. Guide raised part 15a additionally has an opening 99 fashioned as a bearing opening, which is provided to accept clamping projection 94 and to bear it in movable fashion in opening 99. In an accepting state, clamping unit 90, in an unclamped state of clamping unit 90, can be mounted such that clamping projection 94 acts to guide battery device 16. In an acceptance state, clamping unit 90, in a clamped state of clamping unit 90, can be mounted such that clamping projection 94 acts to clamp battery device 16. In a clamped state, clamping projection 94 can be provided to exert a clamping force on guide raised part 17a of battery guide unit 17. The clamping force can act on guide raised part 17a transversely, in particular orthogonally, or parallel to plane of acceptance 56.

In addition, it can be useful for clamping element 92 to be displaceable relative to actuating element 54, via a knee lever unit 108, from an unclamped state (FIG. 11, section C-C in FIG. 8) into a clamped state (FIG. 12, section C-C in FIG. 8); cf. FIGS. 6 to 12. Knee lever unit 108 can be operatively connected to actuating element 54. Knee lever unit 108 has a knee lever element 110 that connects actuating element 54 and clamping element 92, and bears them movably relative to one another. Knee lever element 110 is provided to convert a translational movement of actuating element 54 into a rotational movement of clamping element 92. Knee lever element 110 is mounted so as to be rotatable about a first actuation axis of rotation 116 relative to actuating element 54, and about a clamping axis of rotation 118 relative to clamping element 92. Clamping axis of rotation 118 and actuation axis of rotation 116 are situated at a distance from one another and in particular parallel to one another.

The two clamping elements 92 are provided, which grasp battery device 16 symmetrically at least in some sections and act counter to one another. Clamping element 92 clamps battery device 16 perpendicular to direction of acceptance 86 of battery device 16, with a frictional fit.

What is claimed is:

1. An actuating unit for releasing a battery device for a hand-held power tool, comprising:
   a locking element configured to lock the actuating unit; and
   an actuating element configured to move the locking element from a retaining state of the actuating unit into a release state of the actuating unit;
   wherein in the release state, the locking element is held with a positive fit and/or with a frictional fit,
   wherein in the release state, the actuating element remains at least for a limited time in the release state and independent of an actuation of the actuating unit, such that the battery device can be detached or released from the hand-held power tool without requiring further actuation by an operator, and
   wherein the actuating unit, in the release state, forms a bistable state in which the actuating unit remains for at least a limited time in the release state when there is an actuation of the actuating unit, due to the locking element being configured to automatically lock in place within a perforation of the actuating unit after the release state has been reached, and automatically return from the release state to the retaining state as a function of an acceptance process and/or a relative movement of the battery device.

2. The actuating unit as recited in claim 1, wherein in at least the release state, the actuating element is pre-tensioned by a first spring element to exert a force on the actuating element and/or on the locking element, and to displace the actuating element from the release state into the retaining state.

3. The actuating unit as recited in claim 2, wherein in at least the release state, the locking element is pre-tensioned by a second spring element to exert a force on the locking element to hold the locking element in the release state.

4. The actuating unit as recited in claim 3, further comprising:
   a control element configured to hold the locking element in the release state or the retaining state, via the first spring element and/or the second spring element.

5. The actuating unit as recited in claim 4, wherein the control element has a stop surface that is configured to hold the locking element in the release state with a positive fit and/or with a frictional fit.

6. The actuating unit as recited in claim 3, further comprising:
   a coupling element configured to contact the locking element in the release state.

7. The actuating unit as recited in claim 6, wherein the coupling element is situated on a side of the locking element facing away from the second spring element.

8. The actuating unit as recited in claim 6, wherein the coupling element is in a shape of a ball or in a shape of a cone, the coupling element being mounted so as to be movable at least relative to the locking element.

9. The actuating unit as recited in claim 6, wherein the coupling element stands out relative to the hand-held power tool at least in some segments.

10. The actuating unit as recited in claim 1, wherein the locking element is configured to be displaced from the release state into the retaining state as a function of a relative movement of the battery device.

11. The actuating unit as recited in claim 1, wherein the coupling element is configured to displace the locking element from the release state into the retaining state.

12. The actuating unit as recited in claim 1, wherein a triggering element of the battery device is configured to exert a triggering force on the locking element indirectly or directly, in such a way that the locking element is displaced from the release state into the retaining state.

13. The actuating unit as recited in claim 1, further comprising:
  a coupling element configured to exert a triggering force on the locking element in such a way that the locking element is displaced from the release state into the retaining state.

14. The actuating unit as recited in claim 13, wherein the coupling element is configured to move, via the battery device which is movable relative to the coupling element, in such a way that the coupling element exerts a triggering force on the locking element.

15. A hand-held power tool, comprising:
  an actuating unit for releasing a battery device from the hand-held power tool, the actuating unit including:
    a locking element configured to lock the actuating unit, and
    an actuating element configured to move the locking element from a retaining state of the actuating unit into a release state of the actuating unit,
  wherein in the release state, the locking element is held with a positive fit and/or with a frictional fit; and
  a locking unit configured to lock the battery device to the hand-held power tool, wherein the locking unit includes a second locking element configured to lock the battery device relative to the hand-held power tool with a positive fit,
  wherein in the release state, the actuating element remains at least for a limited time in the release state and independent of an actuation of the actuating unit, such that the battery device can be detached or released from the hand-held power tool without requiring further actuation by an operator, and
  wherein the actuating unit, in the release state, forms a bistable state in which the actuating unit remains for at least a limited time in the release state when there is an actuation of the actuating unit, due to the locking element being configured to automatically lock in place within a perforation of the actuating unit after the release state has been reached, and automatically return from the release state to the retaining state as a function of an acceptance process and/or a relative movement of the battery device.

* * * * *